(12) United States Patent
Murata

(10) Patent No.: US 12,625,365 B2
(45) Date of Patent: **\*May 12, 2026**

(54) OPTICAL DEVICE

(71) Applicant: MITUTOYO CORPORATION,
Kawasaki (JP)

(72) Inventor: Keiji Murata, Kanagawa (JP)

(73) Assignee: MITUTOYO CORPORATION,
Kawasaki (JP)

( * ) Notice: Subject to any disclaimer, the term of this
patent is extended or adjusted under 35
U.S.C. 154(b) by 369 days.

This patent is subject to a terminal dis-
claimer.

(21) Appl. No.: 18/495,526

(22) Filed: Oct. 26, 2023

(65) Prior Publication Data

US 2024/0142774 A1 May 2, 2024

(30) Foreign Application Priority Data

Oct. 28, 2022 (JP) .................................. 2022-172809

(51) Int. Cl.
*G02B 21/02* (2006.01)
*G02B 21/08* (2006.01)
*G02B 27/00* (2006.01)
*G02B 27/10* (2006.01)

(52) U.S. Cl.
CPC ........... *G02B 27/005* (2013.01); *G02B 21/02*
(2013.01); *G02B 21/08* (2013.01); *G02B
27/10* (2013.01)

(58) Field of Classification Search
None
See application file for complete search history.

(56) References Cited

U.S. PATENT DOCUMENTS

| | | | |
|---|---|---|---|
| 2005/0230625 A1* | 10/2005 | Zhang ................ | G01N 21/3581 |
| | | | 250/341.1 |
| 2012/0001061 A1* | 1/2012 | Zillmer .................. | G02B 5/003 |
| | | | 29/428 |
| 2019/0226991 A1* | 7/2019 | Sinha ......................... | G01J 3/14 |
| 2024/0142762 A1* | 5/2024 | Murata ................ | G02B 21/082 |

FOREIGN PATENT DOCUMENTS

| | | |
|---|---|---|
| JP | H07-014412 U | 3/1995 |
| JP | 2013-140032 A | 7/2013 |
| JP | 2015-127776 A | 7/2015 |

* cited by examiner

*Primary Examiner* — Derek S. Chapel
(74) *Attorney, Agent, or Firm* — Rankin, Hill & Clark
LLP

(57) ABSTRACT

An optical device comprises: an image forming lens; an
objective lens; an imaging device; a beam splitter; a coaxial
epi-illumination optical system; and an optical damper hav-
ing a damper surface. The beam splitter, the image forming
lens, and the imaging device are arranged along an optical
axis of the objective lens. An optical axis of the coaxial
epi-illumination optical system is perpendicular to the opti-
cal axis of the objective lens. The beam splitter and the
optical damper are arranged along the optical axis of the
coaxial epi-illumination optical system. A normal direction
of the damper surface is perpendicular to the optical axis of
the objective lens and inclines with respect to the optical axis
of the coaxial epi-illumination optical system without being
perpendicular to the optical axis of the coaxial epi-illumi-
nation optical system.

12 Claims, 9 Drawing Sheets

OPTICAL DEVICE

CROSS-REFERENCE TO RELATED APPLICATIONS

This application is based upon and claims the benefit of Japanese Patent Application No. 2022-172809, filed on Oct. 28, 2022, the entire contents of which are incorporated herein by reference.

BACKGROUND

Field

Embodiments described herein relate generally to an optical device used for a microscope, a vision measuring device, a vision measuring probe, and the like.

Description of the Related Art

There has been known an objective lens that includes: an image forming lens disposed in an optical path between an objective lens and an imaging device; a beam splitter disposed along an optical axis of the objective lens; and a coaxial epi-illumination optical system configured to be able to illuminate an imaging target via the beam splitter and arranged in an optical path different from the optical path in which the image forming lens is arranged. In such an optical device, a part of unnecessary light transmitted through the beam splitter from the coaxial epi-illumination optical system is applied to the imaging device via the image forming lens, causing a flare.

Therefore, in Japanese Patent Application Publication No. 2013-140032, suppression of a flare is attempted by irradiating flocked fabric with unnecessary light transmitted through a beam splitter to absorb the unnecessary light. However, the flocked fabric causes contamination. In addition, since a reflectance of the flocked fabric is not zero, a flare occurs when an attempt is made to ensure brightness of coaxial epi-illumination. Accordingly, the effects thereof are not sufficient.

Further, in Japanese Utility Model Application Publication No. 7-014412, suppression of a flare is attempted by reflecting unnecessary light transmitted through a beam splitter in a direction approximately parallel to or perpendicular to the beam splitter (described as a half mirror in the document). However, in Japanese Utility Model Application Publication No. 7-014412, the reflected light enters an inside of a surface including an optical axis of an image forming system and becomes new flare light. For example, the light reflected in a direction approximately parallel to the beam splitter enters the image forming lens and is easily reflected as a flare. The light reflected in a direction perpendicular to the beam splitter enters the objective lens, thereby causing illumination unevenness, and the light that hits members, such as a frame and a spacer, is reflected and scattered and thereby reflected as a flare. In particular, when a decrease in the size of an entire optical device is attempted, lenses having a large refractive power are densely arranged. Accordingly, an event in which the above-described flare light contrarily becomes noticeable upon receiving light condensing action possibly happens.

DETAILED DESCRIPTION

Figure 1:
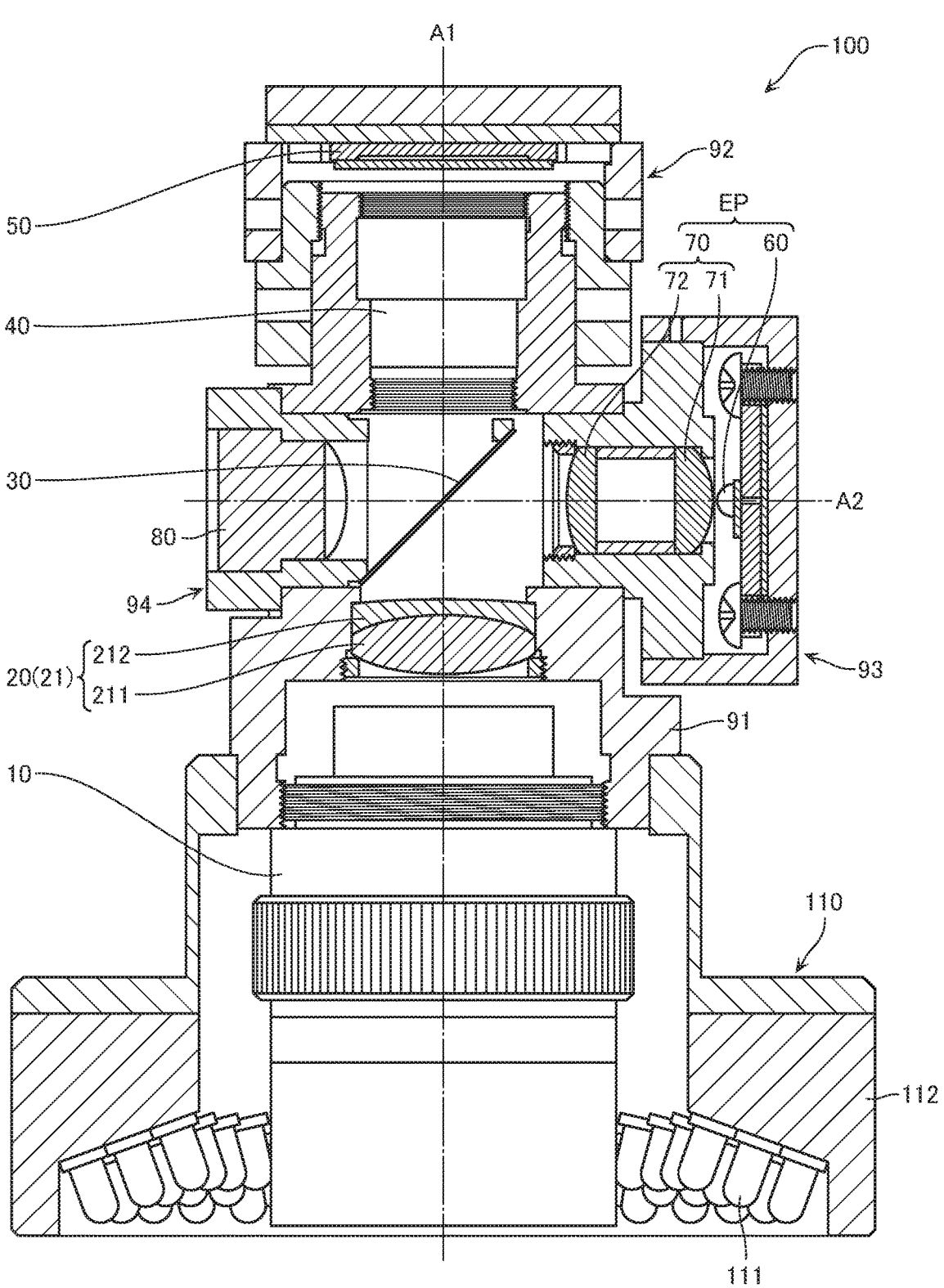
FIG. 1 is a cross-sectional view of an optical device according to a first embodiment of the present invention.

An optical device according to one embodiment of the present invention comprises: an image forming lens disposed in an optical path between an objective lens and an imaging device, the image forming lens forming an image of light incident via the objective lens on an imaging surface of the imaging device; a beam splitter disposed along an optical axis of the objective lens; a coaxial epi-illumination optical system configured to be able to illuminate an imaging target via the beam splitter, the coaxial epi-illumination optical system being arranged in an optical path different from the optical path in which the image forming lens is arranged; and an optical damper having a damper surface. The beam splitter, the image forming lens, and the imaging device are arranged along the optical axis of the objective lens. An optical axis of the coaxial epi-illumination optical system is perpendicular to the optical axis of the objective lens. The beam splitter and the optical damper are arranged along the optical axis of the coaxial epi-illumination optical system. A normal direction of the damper surface is perpendicular to the optical axis of the objective lens and inclines with respect to the optical axis of the coaxial epi-illumination optical system without being perpendicular to the optical axis of the coaxial epi-illumination optical system.

An optical device according to another embodiment of the present invention comprises: an image forming lens disposed in an optical path between an objective lens and an imaging device and forms an image of light incident via the objective lens on an imaging surface of the imaging device; a beam splitter disposed along an optical axis of the objective lens; a coaxial epi-illumination optical system configured to be able to illuminate an imaging target via the beam splitter and arranged in an optical path different from the optical path in which the image forming lens is arranged; and an optical damper having a damper surface. The beam splitter and the coaxial epi-illumination optical system are arranged along the optical axis of the objective lens. An optical axis of the image forming lens is perpendicular to the optical axis of the objective lens. The imaging device, the beam splitter, and the optical damper are arranged along the optical axis of the image forming lens. A normal direction of the damper surface is perpendicular to the optical axis of the objective lens and inclines with respect to the optical axis of the image forming lens without being perpendicular to the optical axis of the image forming lens.

The present invention can provide an optical device that can inhibit the generation of a flare during coaxial epi-illumination.

In the following, optical devices according to embodiments of the present invention are described.

Unless otherwise noted, the term "lens" described in the specification may mean one lens or a combination of a plurality of lenses. In addition, when the "lens" means a combination of a plurality of lenses, at least a part of the plurality of lenses may constitute a cemented lens or may be spaced from one another. For example, an "objective lens" and an "image forming lens" may mean one lens or a combination of a plurality of lenses. However, the "lens" means one lens for those whose curved surfaces are defined, such as a biconvex lens, a plano-convex lens, a plano-concave lens, and a meniscus lens.

The term "lens group" described in the specification may mean a combination of a plurality of lenses. At least a part of the plurality of lenses may constitute a cemented lens or may be spaced from one another.

First Embodiment

Next, the first embodiment of the present invention is described with reference to FIG. 1 to FIG. 5. Note that the following embodiments are only examples and not described for the purpose of limiting the present invention. The following drawings are schematic, and for convenience of explanation, a part of a configuration or the like is omitted in some cases. Parts common in a plurality of embodiments are attached by same reference numerals and their descriptions may be omitted.

As illustrated in FIG. 1, an optical device 100 according to the embodiment is configured to be able to be attached to and detached from an objective lens 10. The optical device 100 includes a first lens group 20, a beam splitter 30, a second lens group 40, and an imaging device 50 that are arranged in sequence from a side close to the objective lens 10 along an optical axis A1 of the objective lens 10. The first lens group is constituted of, for example, a cemented lens 21. The cemented lens 21 is composed of, for example, a first lens 211 formed of a biconvex lens and a second lens 212 formed of a meniscus concave lens.

The optical device 100 further includes a coaxial epi-illumination optical system EP. An optical axis A2 of the coaxial epi-illumination optical system EP is perpendicular to the optical axis A1. The optical axis A1 intersects with the optical axis A2 on a reflecting surface of the beam splitter 30. The coaxial epi-illumination optical system EP includes a light source 60 and an illumination lens group 70 that are arranged in sequence from a side far from the beam splitter 30 along the optical axis A2. The illumination lens group 70 is composed of, for example, a condenser lens 71 and a plano-convex lens 72. The coaxial epi-illumination optical system EP is configured to be able to illuminate an imaging target via the beam splitter 30, the first lens group 20, and the objective lens 10. An optical damper 80 is disposed at a position on an opposite side of the light source 60 and the illumination lens group 70 with respect to the beam splitter 30 along the optical axis A2 of the coaxial epi-illumination optical system EP (the optical axis A2 of the illumination lens group 70).

The objective lens 10, the first lens group 20, the beam splitter 30, and the second lens group 40 are installed in a cylindrically-shaped housing 91. In order to allow the objective lens 10 to be conveniently replaced with one having a different magnification, the objective lens 10 is installed at a lower end of the housing 91 in an attachable and detachable manner. A fixing member 92 for fixing the imaging device 50 to the housing 91 is installed at an upper end of the housing 91. Although not illustrated, a low-pass filter, a color correction filter (such as an ND filter and an IR cut filter), a polarization filter, such as a wavelength plate and an analyzer, and a parallel flat plate, such as cover glass for protecting a sensor surface of the imaging device 50, may be included in an optical system.

The light source 60 and the illumination lens group 70 are fixed to one side surface of the housing 91 by a fixing member 93. The optical damper 80 is fixed to the other side surface of the housing 91 by a fixing member 94. A ring light 110 is mounted at the lower end of the housing 91 so as to surround the objective lens 10. The ring light 110 is circularly arranged so as to surround a lower end of the objective lens and includes a plurality of light sources 111 and a cover 112. The plurality of light sources 111 include LEDs and the like that apply illuminating light toward a lower inner side. The cover 112 supports these light sources 111 and covers an upper side of the light sources 111.

Figure 2:
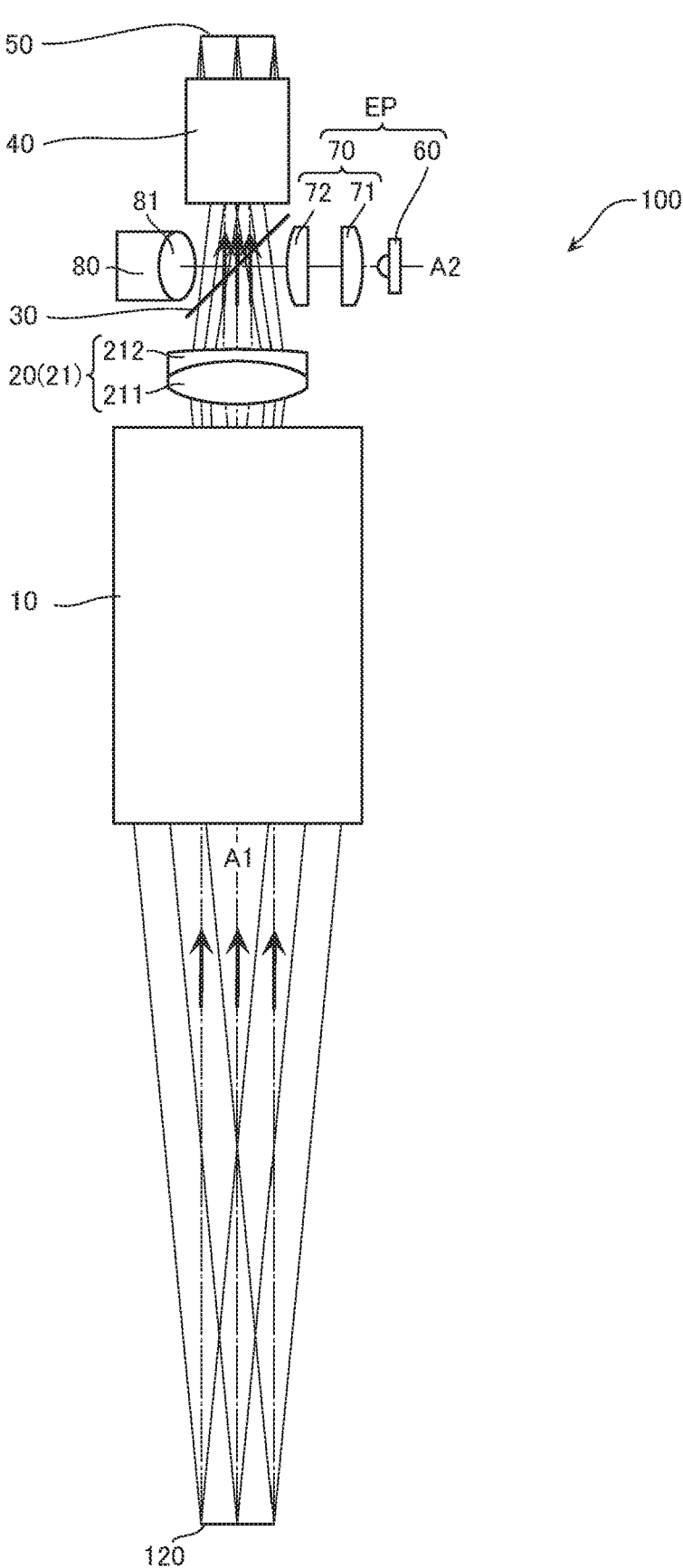
FIG. 2 is a schematic diagram of the optical device.

FIG. 2 is a diagram illustrating a schematic configuration including light rays of the optical device 100 of FIG. 1. In the following, each portion is described by regarding an imaging target 120 side as a front stage and an imaging device 50 side as a rear stage for the objective lens 10, the first lens group 20, the beam splitter 30, and the second lens group 40 and regarding a light source 60 side as a front stage and the imaging target 120 side as a rear stage for the coaxial epi-illumination optical system EP.

The objective lens 10 has, for example, an exit pupil inside. A principal ray at each object height emitted from a rear end of the objective lens 10 is separated from the optical axis A1 as it moves further away from the objective lens 10. The first lens group 20 is arranged at a rear stage of the objective lens 10.

The first lens group 20 has the cemented lens 21 having a positive refractive power as a whole. The cemented lens 21 is constituted of, for example, a combination of the first lens 211 having a positive refractive power and the second lens 212 having a negative refractive power.

Figure 3:
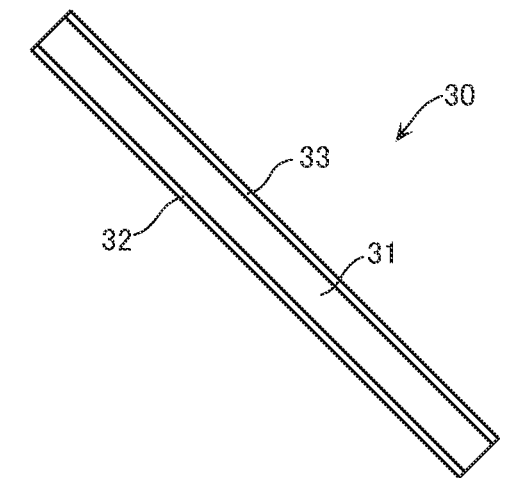
FIG. 3 is a side view of a beam splitter of the optical device.

The beam splitter 30 is disposed at a rear stage of the first lens group 20. In the embodiment, for example, as illustrated in FIG. 3, the beam splitter 30 includes a film base material 31 made of a resin film or a thin-type glass. Coating films 32 and 33 may be disposed on one side or both sides of the film base material 31.

The second lens group 40 (FIG. 2) is disposed at a rear stage of the beam splitter 30. The second lens group 40 functions as an image forming lens that forms an image of light incident via the objective lens 10, the first lens group 20, and the beam splitter 30 in a desired size on a imaging surface of the imaging device 50. The second lens group 40 may include a lens having a negative refractive power and a lens having a positive refractive power. Further, the second lens group 40 may include a tube lens for magnifying or demagnifying an image formed on the imaging surface of the imaging device 50.

The imaging device 50 is disposed at a rear stage of the second lens group 40. The imaging device 50 is, for example, an imaging element, such as CMOS and CCD, having a predetermined pixel count. As the imaging device 50, for example, a PYTHON 1300 (pixel size 4.8 µm) (manufactured by ON Semiconductor Corporation) or the like can be used.

The light source 60 has a small-sized light source, such as a chip LED, in the embodiment. The illumination lens group 70 has, for example, the condenser lens 71 (plano-convex lens) that generates a Fourier transformation image of the light source 60 and the plano-convex lens 72 that conveys the Fourier transformation image.

The optical damper 80 has a damper surface 81. A part of unnecessary light transmitted through the beam splitter 30 from the coaxial epi-illumination optical system EP is absorbed on the damper surface 81 of the optical damper 80. A part of such unnecessary light that cannot be absorbed on the damper surface 81 is scattered in a direction that does not enter the first lens group 20 nor the second lens group 40 (such as a direction perpendicular to the optical axis A1) on the damper surface 81. In the first embodiment, surface treatment for blackening is processed on the damper surface 81. When the optical damper 80 is constituted of aluminum, the surface treatment may be black alumite treatment. When the optical damper 80 is constituted of nickel, stainless steel, brass, or the like, the surface treatment may be Raydent treatment (registered trademark). In addition, the surface treatment may be chrome plating or the like.

Next, each portion is described in further detail.

[First Lens Group 20]

When an exit pupil is disposed inside the objective lens 10, a principal ray from a position corresponding to a large object height, that is, an off-axis principal ray from a position away from the optical axis A1, is separated from the optical axis A1 as it moves further away from the objective lens 10. When the off-axis principal ray directly enters the beam splitter 30 from the objective lens 10, a light flux diameter of light entering the beam splitter 30 increases. Accordingly, a necessary diameter and a gripping mechanism (a mechanism that grips the beam splitter 30. See a mechanism that grips a polarization beam splitter 28 in FIG. 4 of the above-described Japanese Patent Application Publication No. 2015-127776) become larger, which has become a factor of an increase in the size of a whole optical system. When a beam splitter surface (a reflecting surface of the beam splitter 30) has an inclination of 45° with respect to the optical axis A1, a large necessary diameter means the optical system lengthening in the optical axis A1 direction as well at the same time, and even in this sense, the optical system has been large in size. However, in the embodiment, since the first lens group 20 having a positive refractive power is disposed at the rear stage of the objective lens 10, the principal ray is refracted to a direction approaching the optical axis and enters the beam splitter 30. In view of this, the light flux diameter of the light entering the beam splitter 30 decreases, and a region required for the beam splitter 30 can be decreased more than that in a case where the first lens group 20 is not disposed. This can decrease the size of the beam splitter 30. When the beam splitter surface has an inclination of 45° with respect to the optical axis A1, a small diameter of the beam splitter is synonymous with the optical system shortening in the optical axis A1 direction as well, and even in this sense, a significant effect is exerted on a decrease in the size of the whole optical system.

For a similar reason, it is not necessary to increase a necessary diameter of the second lens group 40 where the light transmitted through the beam splitter 30 enters, and a decrease in size and weight can be carried out.

From a perspective of aberration correction, fewer number of lenses constituting the second lens group 40 is required, contributing to a decrease in size and weight. When an image is formed on the imaging surface of the imaging device 50, the light being largely refracted by the second lens group 40 is accompanied by occurrence of large aberration. Generally, with an increase in each of a variation in image height and a principal ray angle variation, being largely refracted is required, and the aberration increases correspondingly. The smaller the imaging device 50 is, the more remarkable this phenomenon is.

When the off-axis principal ray enters the beam splitter from the objective lens 10 without interposing the first lens group 20, a light flux is separated from the optical axis A1 and forms a larger image (including a case where an image is formed on infinity) as the principal ray moves further away from the objective lens 10. Therefore, when the imaging device 50 is small in size, the second lens group 40 not only increases in diameter but also needs to significantly vary the image height when an image is formed on the imaging surface and significantly vary the angle of the principal ray. Since this causes large aberration, a larger number of lenses are required for correcting the aberration, resulting in a further increase in the size of the second lens group 40. In particular, it is difficult to inhibit off-axis aberration, such as distortion, coma aberration, astigmatism, and chromatic aberration of magnification. Therefore, a large number of lenses are required for the aberration correction, and a decrease in size and weight including the imaging device 50 is difficult.

On the other hand, in the embodiment, since the principal ray direction is refracted in the direction approaching the optical axis at the first lens group 20 and an image having a small image height is formed, the variation in image height and the principal ray angle variation decrease even when a small-sized imaging device 50 is used. That is, since light rays need not be largely refracted at the second lens group 40, the aberration occurrence decreases, thereby allowing a reduction in the number of lenses required for the aberration correction. Eventually, the second lens group 40 can be made smaller, achieving a decrease in the size and weight of the optical system including the imaging device 50.

Furthermore, since the light flux is focused by the first lens group 20, a decrease in the size and weight of the coaxial epi-illumination optical system. EP can be achieved. Usually, in coaxial epi-illumination, uniform illumination is obtained by relaying a light source image or a Fourier transformation image of a light source to a photographic subject surface. However, when the objective lens 10, the beam splitter 30, and the coaxial epi-illumination optical system EP are arranged without interposing the first lens group 20, one with a large image height is required for the light source image that should be relayed. Therefore, a large light source needs to be used, or the coaxial epi-illumination optical system EP needs to significantly magnify the light source image. In both cases, the coaxial epi-illumination optical system EP increases in diameter.

On the other hand, according to the first embodiment, since the light source image that should be relayed is demagnified by the first lens group 20, the coaxial epi-illumination optical system EP can be made smaller.

When an exit pupil is disposed inside the objective lens 10, a main light flux emitted from the objective lens 10 toward the beam splitter 30 diverges. Therefore, light rays emitted from the objective lens 10 are considered to enter the beam splitter 30 at various incident angles according to the object heights. Here, optical characteristics (such as transmittance, reflectance, or other optical characteristics) of the beam splitter 30 differ depending on the incident angles of the light rays. Therefore, the optical characteristics of the beam splitter 30 vary depending on the object heights in some cases.

Here, as illustrated by bold line arrows in FIG. 2, in the embodiment, in focusing on the principal rays of respective object heights, after the principal rays diverge at the rear stage of the objective lens 10 once, they are caused to approach in a state parallel to the optical axis A1 by the first lens group 20. Accordingly, the incident angles of the principal rays of the respective object heights with respect to the beam splitter 30 can be made approximately constant. This can inhibit a variation of the optical characteristics of the beam splitter 30 depending on the object heights.

When the objective lens 10 is detached from the housing 91, dust and the like easily enter an inside of the housing 91. In particular, when a thin-type beam splitter 30 is used, it is difficult to remove dust and the like without damaging the beam splitter 30. However, according to the embodiment, the first lens group 20 is arranged at the front stage of the beam splitter 30. Accordingly, even when the objective lens 10 is detached from the housing 91, the first lens group 20 can suppress dust and the like entering the inside of the housing 91. Furthermore, an effect of facilitating the removal of dust is provided.

The first lens group 20 transmits emitted light from the coaxial epi-illumination optical system EP in addition to emitted light from the objective lens 10. In the following, influences of the chromatic aberration and reflection of the first lens group 20 by irradiating the first lens group 20 with illuminating light from the coaxial epi-illumination optical system EP are examined.

The first lens group 20 requires a relatively large back focus to allow space for arranging the beam splitter 30. In view of this, a focal length of the first lens group 20 should be lengthened to some extent. In this case, chromatic aberration having a size proportional to the focal length occurs. This easily causes defects as follows. For example, the coaxial epi-illumination becomes color-blurred illumination. Further, even when a planar surface is illuminated, colors vary at each position, or what is called color unevenness occurs. Therefore, in order to reduce the defects, the first lens group 20 is preferably constituted of a cemented lens including a biconvex lens made of low-dispersion glass material and a meniscus concave lens made of high-dispersion glass material.

From the general rule of chromatic aberration (for example, https://en.wikipedia.org/wiki/Achromatic lens), the biconvex lens is preferably selected from crown glass, and the meniscus concave lens is preferably selected from flint glass. The biconvex lens and the meniscus concave lens are preferably selected such that an Abbe number v (at the Fraunhofer d-line, hereinafter not noted blow by blow) for the biconvex lens satisfies $v \geq 50$, and the Abbe number v for the meniscus concave lens satisfies $v \leq 50$ as a condition of the Abbe number.

Moreover, in the embodiment, the first lens group 20 is arranged between the objective lens 10 and the beam splitter 30. Accordingly, it is preferable to inhibit a flare caused by the reflection of the illuminating light from the coaxial epi-illumination optical system EP at the first lens group 20. To this end, it is effective to apply an antireflection coating on surfaces of the cemented lens 21 to reduce Fresnel reflection of a cemented surface of the first lens 211 and the second lens 212.

Generally, a reflectance R of the Fresnel reflection generated at a boundary of lenses having different refractive indexes is expressed by the following Math. 1, where $n_1$ is the refractive index for the first lens 211, and $n_2$ is the refractive index for the second lens 212.

$$R = \left( \frac{n_1 - n_2}{n_1 + n_2} \right)^2 \qquad \text{[Math. 1]}$$

Here, in ordinary antireflection coating, the reflectance R can be reduced to approximately 0.25%. In order to control the reflectance R to be this level of magnitude, $n_1$ and $n_2$ are preferably configured to satisfy a condition expressed by the following Math. 2.

$$\left( \frac{n_1 - n_2}{n_1 + n_2} \right)^2 \leq 0.0025 \qquad \text{[Math. 2]}$$

From Math. 2, the condition "$n_1 - n_2$ is equal to or less than $0.1 \times$(average of $n_1$ and $n_2$)" is obtained.

In the embodiment, for example, the first lens 211 can be a biconvex lens made of glass having a refractive index of 1.516 and an Abbe number of 64.1, and the second lens 212 can be a meniscus concave lens made of glass having a refractive index of 1.593 and an Abbe number of 35.3. In this case, since the Abbe number v for the biconvex lens satisfies $v \geq 50$, and the Abbe number v for the meniscus concave lens satisfies $v \leq 50$, the condition for the chromatic aberration is satisfied. Additionally, since a difference of the refractive indexes between the first lens 211 and the second lens 212 ($n_1 - n_2$) is 0.077, and 0.1 times the average value is 0.155, the above-described condition for the reflectance is satisfied.

[Beam Splitter 30]

Figure 4:
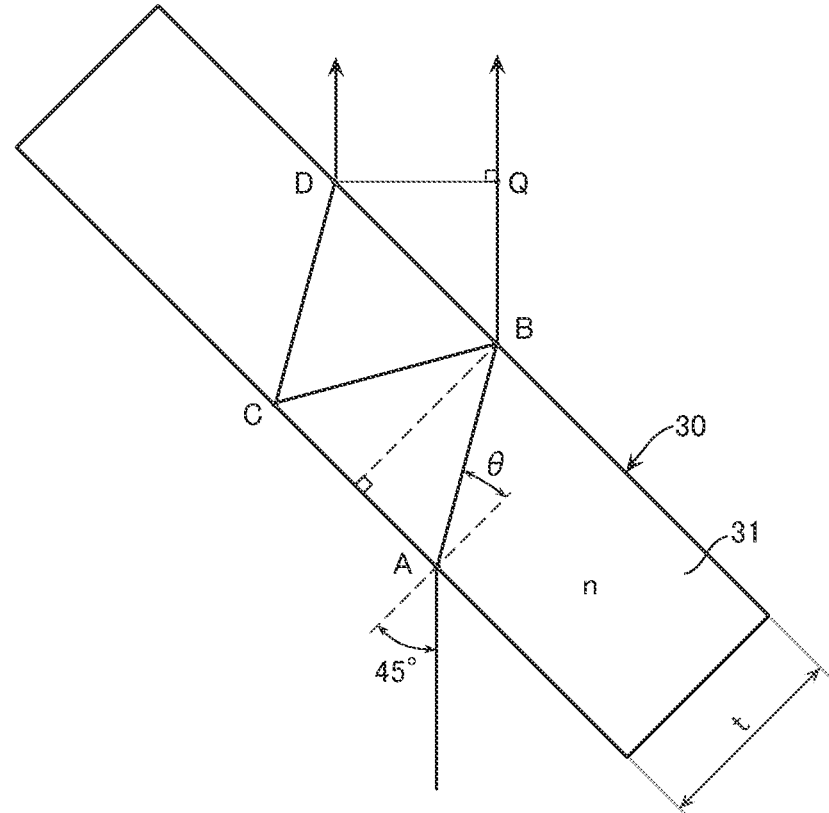
FIG. 4 is a side view of an enlarged part of the beam splitter of the optical device.

In the embodiment, as illustrated in FIG. 3, the film base material 31 is used as the beam splitter 30. By using the film base material 31 as the beam splitter 30, a decrease in weight and size can be achieved better than in cases where a plate type and a cube type are used. However, when the film base material 31 is used, a ghost image may be generated by reflection of both front and rear surfaces. That is, as illustrated in FIG. 4, a light ray entering the beam splitter 30 enters at a point A, is refracted on the film base material 31, and is emitted from a point B. In addition, a part of light reflected at the point B is reflected at a point C and emitted from a point D. The light ray emitted from the point B forms a real image, and the light ray emitted from the point D forms a ghost image. A distance QD between the light ray of the real image emitted from the point B and the light ray of the ghost image emitted from the point D is expressed by the following formula, where t is the thickness of the film base material 31, n is the refractive index, the incident angle to the film base material 31 is 45°, and θ is the refractive angle.

$$n \times \sin \theta = 1 \times \sin 45° = \frac{1}{\sqrt{2}} \qquad \text{[Math. 3]}$$

$$\theta = \sin^{-1} \frac{1}{\sqrt{2}\, n}$$

$$QD = \sqrt{2}\, t\, \tan \left( \sin^{-1} \frac{1}{\sqrt{2}\, n} \right)$$

Here, interpolation is processed on a signal obtained from each pixel of the imaging device 50 in units of a plurality of pixels for the purpose of removing the effects of noise and avoiding the generation of jaggies. For example, considering bicubic interpolation, for a monochrome image, interpolation is processed from surrounding 3×3 pixels, and for a color Bayer pattern, interpolation is processed from surrounding 4×4 pixels. For example, for a color CMOS sensor having a pixel pitch p=4.8 μm, a range of interpolation processing is (4×4.8)×(4×4.8)=19.2 μm×19.2 μm. Therefore, when the distance QD between the real image and the ghost image falls within the range of interpolation processing, the real image and the ghost image are averaged, and substantially, a double image is no longer generated. Therefore, when p is the pixel pitch of the imaging device 50 and N×N is the unit pixel count for interpolation processing of a pixel value, the thickness t and the refractive index n of the film base material 31 are preferably set to satisfy a condition of the following Math. 4.

$$\sqrt{2}\, t\, \tan\!\left(\sin^{-1}\frac{1}{\sqrt{2}\,n}\right) < Np \qquad \text{[Math. 4]}$$

In the embodiment, for example, since 0.74951×20 μm=14.99 μm by using glass ribbon (manufactured by Nippon Electric Glass Co., Ltd.) having a refractive index n=1.51 and a thickness t=20 μm, the condition of Math. 4 is satisfied, allowing suppression of the generation of a ghost image.

As the film base material 31 of the beam splitter 30, a resin film, such as acrylic, polystyrene, cellophane, nitrocellulose, polypropylene, and polyester, or thin plate glass made of glass ribbon (manufactured by Nippon Electric Glass Co., Ltd.) having a thickness in a range from 10 μm to μm can be used.

Here, by processing coating on one surface or both surfaces of the film base material 31 constituting the beam splitter 30, the optical characteristics and the like of the film base material 31 are considered to be varied. However, as described above, when an exit pupil is disposed inside the objective lens 10, the incident angles on the coating processed surface differ depending on the object heights, and accordingly, the optical characteristics of the beam splitter 30 vary depending on the object heights. In such a case, it is difficult to obtain uniform optical characteristics and the like on an entire visual field through the coating processing.

However, in the embodiment, the principal rays are subject to refraction in a direction approaching the optical axis A1 by the first lens group 20, thereby allowing the incident angles of the principal rays of the respective object heights with respect to the beam splitter 30 to be made approximately constant. This can inhibit a variation of the optical characteristics of the beam splitter 30 depending on the object heights. In such a configuration, for example, as illustrated in FIG. 3, especially when coating is processed on one surface or both surfaces of the film base material 31, the optical characteristics and environmental tolerance of the film base material 31 are preferably controllable.

For example, the coating film 32 formed on a surface on a coaxial epi-illumination optical system EP side of the film base material 31 may be a beam splitter coat film. The beam splitter coat film may be, for example, a single layer film having a quarter wavelength thickness of a material with a high refractive index compared with the refractive index of the film base material 31. As the material with a high refractive index, for example, a dielectric material of $NbO_5$, $Ta_2O_5$, $TiO_2$, $ZrO_2$, $Al_2O_3$, ZnS, or the like can be used. Further, the coating film 33 formed on the surface on an opposite side to the coaxial epi-illumination optical system EP of the film base material 31 may be, for example, an antireflection coating. The antireflection coating may be, for example, a single layer film having a quarter wavelength thickness of a material with a low refractive index compared with the refractive index of the film base material 31. As the material with a low refractive index, for example, a dielectric material of $MgF_2$, $SiO_2$, or the like can be used.

Here, when the coating films 32 and 33 are formed on the film base material 31 by coating processing, such as vacuum evaporation, effects, such as stress, in association with a difference in thermal expansion coefficient may cause warpage, wrinkling, and the like on the film base material 31. The warpage and wrinkling not only degrade the optical characteristics at completion but also degrade assemblability significantly. The thinner the film base material 31 is, the less rigid it becomes. Accordingly, the effects are especially noticeable. Therefore, the materials of the coating films 32 and 33 are preferably selected to be able to inhibit such effects. Table 1 illustrates examples of a relationship between the material and stress proper for the coating processing when both surfaces are single layer films and coating is processed on both surfaces.

TABLE 1

| | Tensile Stress | Compressive Stress |
|---|---|---|
| Beam Splitter Coat Film (High Refractive Index) | $TiO_2$ $Al_2O_3$ | $Ta_2O_5$ $ZrO_2$ ZnS |
| Antireflection Coating (Low Refractive Index) | $MgF_2$ | $SiO_2$ |

For example, when a high refractive index film, such as $TiO_2$ and $Al_2O_3$, which causes tensile stress, is coated on one surface of the film base material 31 as a beam splitter coat film, a low refractive index film, such as $MgF_2$, which also causes tensile stress, is coated on the other surface of the film base material 31. Further, for example, when a high refractive index film, such as $Ta_2O_5$, $ZrO_2$, and ZnS, which causes compressive stress, is coated on the one surface of the film base material 31 as a beam splitter coat film, a low refractive index film, such as $SiO_2$, which also causes compressive stress, is coated on the other surface of the film base material 31.

Note that these are just examples. When a sign of stress generated is changed by the condition at the time of coating, an optimal material to be coated on the other surface also possibly changes according to the sign of stress. For example, it is known that for a high refractive index material of $Nb_2O_5$, tensile stress is caused when an ion-assisted method is used, and compressive stress is caused when the ion-assisted method is not used. When the former is used for beam splitter coating, a single layer film of $MgF_2$ may be coated on the other surface as an antireflection coating. When the latter is used for beam splitter coating, a single layer film of $SiO_2$ may be coated on the other surface as an antireflection coating.

This cancels the stresses of the coating films 32 and 33 on both surfaces and can suppress warpage and wrinkling of the film base material 31. When a surface of a resin film base material 31 is exposed, there is a problem in that the film base material 31 is charged with static electricity to easily attract dust and is easily deformed and changed in quality by moisture absorption. By coating, an effect of suppressing the problem is obtained. Other than being formed of single layers, the coating films 32 and 33 may be formed of multilayer films. In this case, the optical performance and environmental tolerance can be further enhanced. The coating films 32 and 33 may be hard coat films, metal films, and the like. In the above-described cases of multilayer films, hard coat films, metal films, and the like, it is further preferable to select the type and method of coating according to a sign of stress generated such that the stress with the same sign is generated on both surfaces. In the multilayer films, stress reduction may be achieved on each side by using respective materials to be stacked that generate stresses with opposite signs. For example, stress reduction can be attempted to avoid the occurrence of warpage and wrinkling even by a method such that $Al_2O_3$, which causes tensile stress, is evaporated on a first layer, $Ta_2O_5$, which causes compressive stress, is evaporated on a second layer, and $MgF_2$, which causes tensile stress, is evaporated on a third layer.

[Coaxial Epi-illumination Optical System EP]

In the embodiment, as the coaxial epi-illumination optical system EP, the light source 60 (FIG. 2) including a chip LED and the illumination lens group 70 including the condenser lens 71 and the plano-convex lens 72 are used. The condenser lens 71 focuses the light from the light source 60 to form a Fourier transformation image thereof. After the Fourier transformation image is conveyed through the plano-convex lens 72 at the rear stage and reflected at the beam splitter 30, the Fourier transformation image is relayed to a photographic subject surface via the first lens group 20 and the objective lens 10. Generally, while a chip LED has large unevenness depending on positions, a Fourier transformation image thereof has small unevenness. Accordingly, by configuring as described above, illuminating light having unevenness reduced can be generated on a photographic subject surface.

In the illumination lens group 70, a diffusion plate, a microlens array (fly-eye lens), and the like may be included. In order to reduce unevenness, spacing between the condenser lens 71 and the plano-convex lens 72 may be changed to impair a relay relationship of (defocus) the Fourier transformation image to the photographic subject surface.

[Optical Damper 80]

Figure 5:
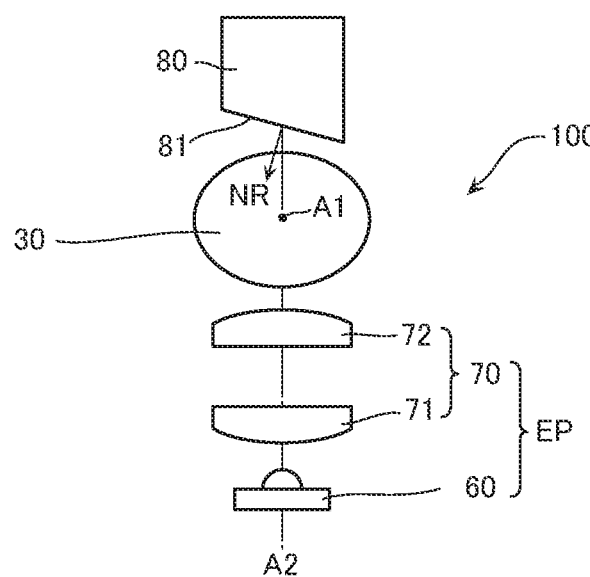
FIG. 5 is a schematic diagram viewed from an imaging device side of the optical device.

FIG. 5 is a schematic diagram when the optical damper 80 is viewed from the imaging device 50 side in the optical axis A1 direction. As illustrated in FIG. 5, the optical damper 80 has the damper surface 81. A normal direction NR of the damper surface 81 is perpendicular to the optical axis A1 of the objective lens 10. The normal direction NR of the damper surface 81 inclines with respect to the optical axis A2 of the coaxial epi-illumination optical system EP and is not perpendicular to the optical axis A2. For example, it is preferable to perform processing to reduce reflectance on a surface of the damper surface 81. As such processing, for example, matting by applying a black coating material or blasting, or processing, such as chemical surface modification by acid, alkali, and the like, surface roughening by laser, or attaching a material that easily absorbs light, such as flocked fabric, can be used.

Note that the above-described normal direction NR of damper surface 81 is adjustable, as necessary.

[Effects]

The optical device 100 according to the embodiment includes the optical damper 80. The normal direction NR of the damper surface 81 is perpendicular to the optical axis A1 of the objective lens 10. The normal direction NR of the damper surface 81 inclines with respect to the optical axis A2 of the coaxial epi-illumination optical system EP and is not perpendicular to the optical axis A2. With such a configuration, as described above, a part of unnecessary light transmitted through the beam splitter 30 from the coaxial epi-illumination optical system EP can be absorbed on the damper surface 81 of the optical damper 80. Further, as described above, a part of such unnecessary light that cannot be absorbed on the damper surface 81 can be scattered in a direction that does not enter the first lens group 20 nor the second lens group 40 (such as a direction perpendicular to the optical axis A1) on the damper surface 81. This can suppress unnecessary light transmitted through the beam splitter 30 from the coaxial epi-illumination optical system EP entering the first lens group 20 or the second lens group 40 via the damper surface 81. As a result, the occurrence of illumination unevenness and/or a flare on the objective lens 10 side and the occurrence of a flare on the imaging device 50 side can be suppressed.

Second Embodiment

Next, the second embodiment of the present invention is described with reference to FIG. 6. In the following description, parts similar to those in the first embodiment are attached by same reference numerals and their descriptions are omitted.

An optical device 100A according to the second embodiment is basically configured similarly to the optical device 100 according to the first embodiment. However, in the optical device 100A, for example, a surface-emitting light source, such as a Chip-on-Board (COB) LED, is used as a light source 60A of the coaxial epi-illumination optical system EP. In the optical device 100A, the coaxial epi-illumination optical system EP does not include the illumination lens group 70. Such a configuration can achieve a further decrease in size by omitting the illumination lens group 70. As the light source 60A, another surface-light-emitting element, such as an organic EL, may be used.

Figure 6:
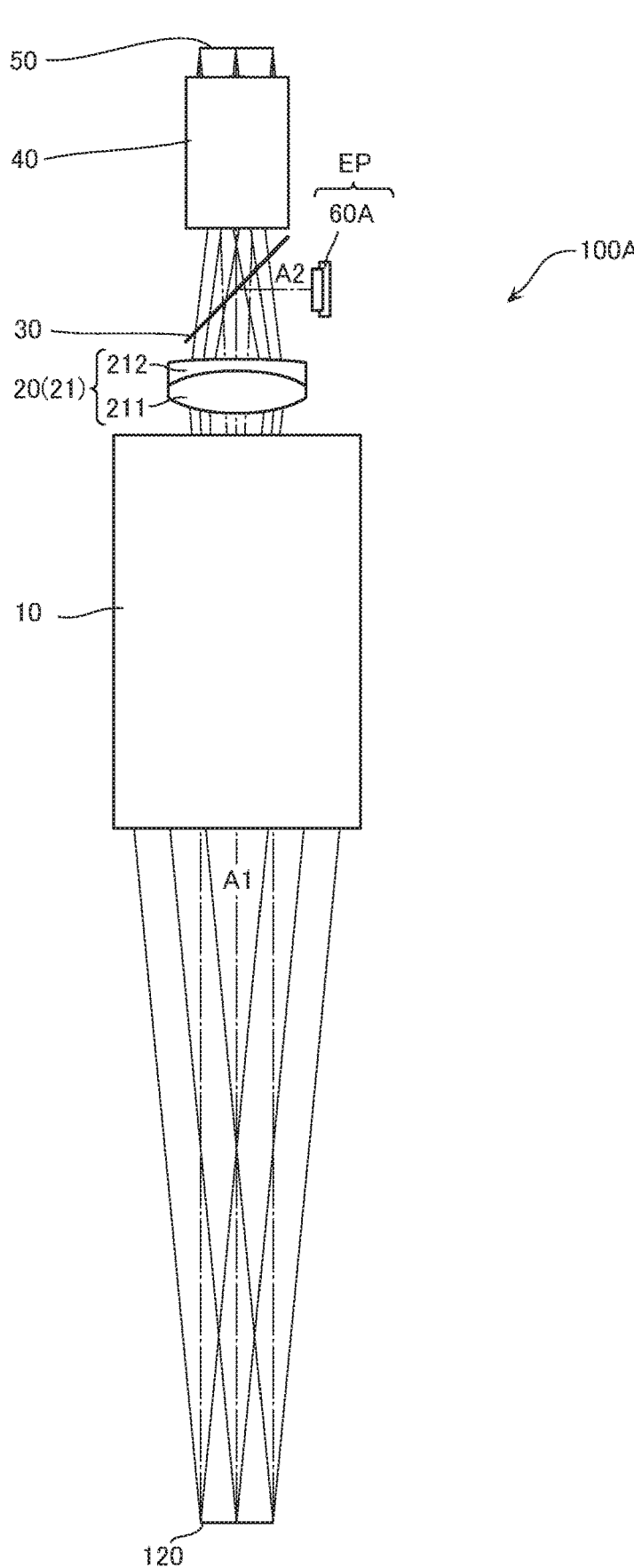
FIG. 6 is a schematic diagram of an optical device according to a second embodiment of the present invention.

While the optical damper 80 is not illustrated in FIG. 6, the optical devices include the optical damper 80 or a configuration corresponding thereto throughout all embodiments.

Third Embodiment

Figure 7:
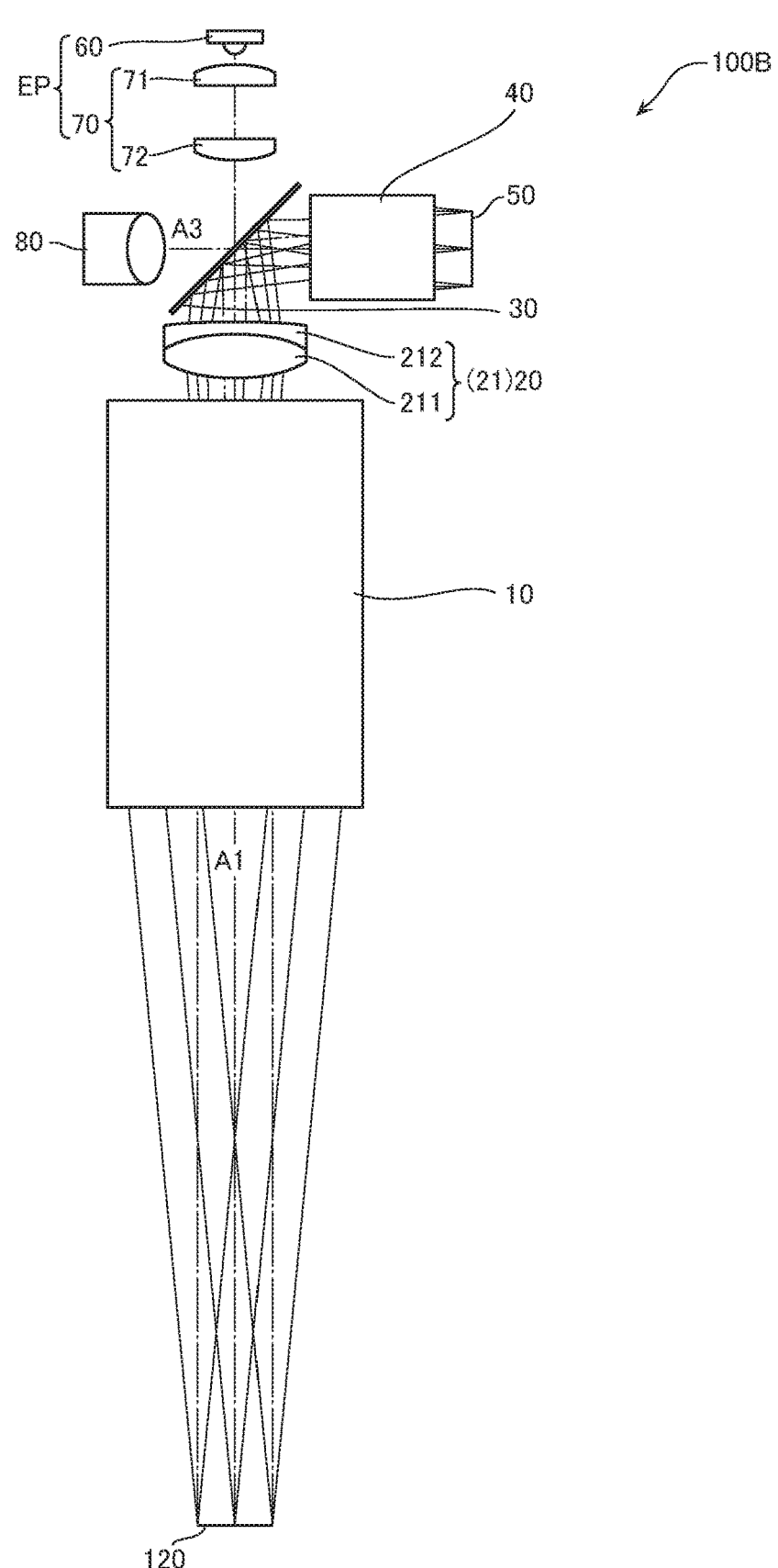
FIG. 7 is a schematic diagram of an optical device according to a third embodiment of the present invention.

Next, the third embodiment of the present invention is described with reference to FIG. 7. In the following description, parts similar to those in the first embodiment and the second embodiment are attached by same reference numerals and their descriptions are omitted.

An optical device 100B according to the third embodiment is basically configured similarly to the optical device 100 according to the first embodiment. However, in the optical device 100B, the second lens group 40 and the imaging device 50 are arranged on a reflection side of the beam splitter 30, and the coaxial epi-illumination optical system EP is arranged on a transmission side of the beam splitter 30. That is, the optical device 100B includes the first lens group 20, the beam splitter 30, the illumination lens group 70, and the light source 60 from a side close to the objective lens 10 along the optical axis A1 of the objective lens 10. In the optical device 100B, an optical axis A3 of the second lens group 40 is perpendicular to the optical axis A1. The optical axis A1 intersects with the optical axis A3 on the reflecting surface of the beam splitter 30. Further, the imaging device 50 and the second lens group 40 are disposed in sequence from a side far from the beam splitter 30 along the optical axis A3. The optical damper 80 is disposed at a position on an opposite side of the imaging device 50 and the second lens group 40 with respect to the beam splitter 30 along the optical axis A3 of the second lens group 40.

In such a configuration, the optical damper 80 scatters or absorbs unnecessary light from the light source 60 reflected at the beam splitter 30.

Generally, the beam splitter 30 is easy to control transmission characteristics in manufacturing. Accordingly, for example, when a light source light volume of the coaxial epi-illumination optical system EP is low, the embodiment is effective.

The optical device 100B according to the third embodiment may include a surface-emitting light source, such as a COB LED, as the light source 60 of the coaxial epi-illumination optical system EP, similarly to the optical device 100A according to the second embodiment.

Fourth Embodiment

Figure 8:
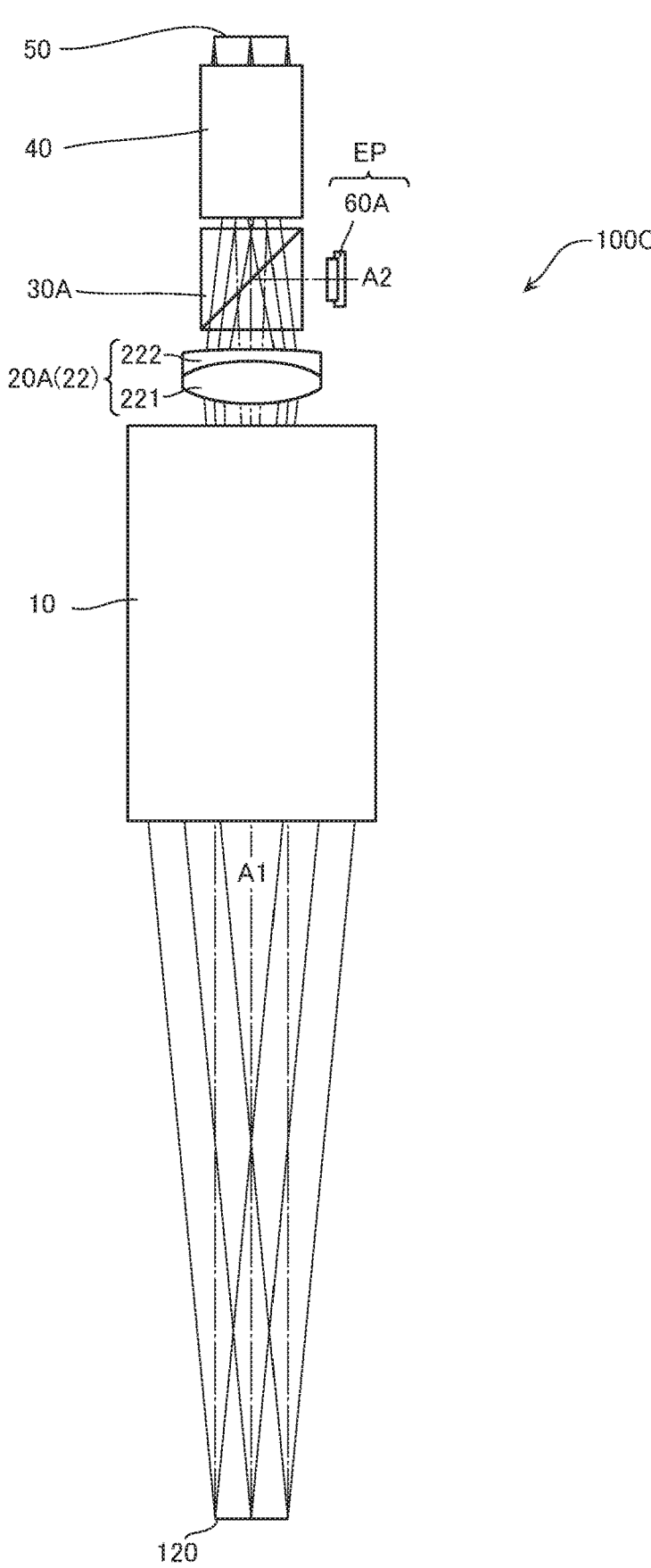
FIG. 8 is a schematic diagram of an optical device according to a fourth embodiment of the present invention.

Next, the fourth embodiment of the present invention is described with reference to FIG. 8. In the following description, parts similar to those in the first embodiment to the third embodiment are attached by same reference numerals and their descriptions are omitted.

An optical device 100C according to the fourth embodiment is basically configured similarly to the optical device 100A according to the second embodiment. However, the optical device 100C includes a beam splitter 30A instead of the beam splitter 30 including the film base material 31. The beam splitter 30A includes cube type glass. A semipermeable membrane is formed on a cemented surface of the cube type glass by coating. The weight of the cube type glass constituting the beam splitter 30A is proportionate to a cube of the length of one side. Therefore, the cube type glass is heavier than a film base material. However, since the optical device 100C according to the fourth embodiment includes the first lens group 20, the beam splitter 30A can be configured to be relatively small in size. Therefore, the beam splitter 30A can be configured to be relatively lightweight. The embodiment can reduce the generation of a ghost image, which is generated when a film base material is used.

In the embodiment, chromatic aberration also occurs by dispersion of glass constituting the beam splitter 30A. Therefore, the chromatic aberration that the first lens group should correct increases compared with the first embodiment, and the difference in the Abbe number of glass constituting the first lens group 20 needs to be increased. The rear stage of the first lens group 20 being replaced with glass is synonymous with an air-converted back focus shortening. Accordingly, the back focus is shortened by a convex lens that precedes correspondingly to strengthen the power of the convex lens.

The beam splitter 30A includes glass having a refractive index of 1.516 and an Abbe number of 64.1. The first lens group 20A includes a cemented lens 22 including a biconvex lens (first lens 221) made of glass having a refractive index of 1.516 and an Abbe number of 64.1 and a meniscus concave lens (second lens 222) made of glass having a refractive index of 1.673 and an Abbe number of 32.1. In this case, the above-described reduction condition for the chromatic aberration and the condition for the refractive index difference are also satisfied. In addition, the reflectance of the Fresnel reflection is 0.24%, which is reduced at a level similar to an antireflection multicoating.

Note that similarly to the optical device 100C according to the fourth embodiment, the optical device 100 according to the first embodiment and the optical device 100B according to the third embodiment may include the beam splitter 30A including cube type glass instead of the beam splitter 30 including the film base material 31. However, in that case, chromatic aberration also occurs by dispersion of glass constituting the beam splitter 30A. The chromatic aberration that the first lens group 20 corrects increases, and the difference in the Abbe number of glass constituting the first lens group 20 needs to be increased.

Fifth Embodiment

Figure 9:
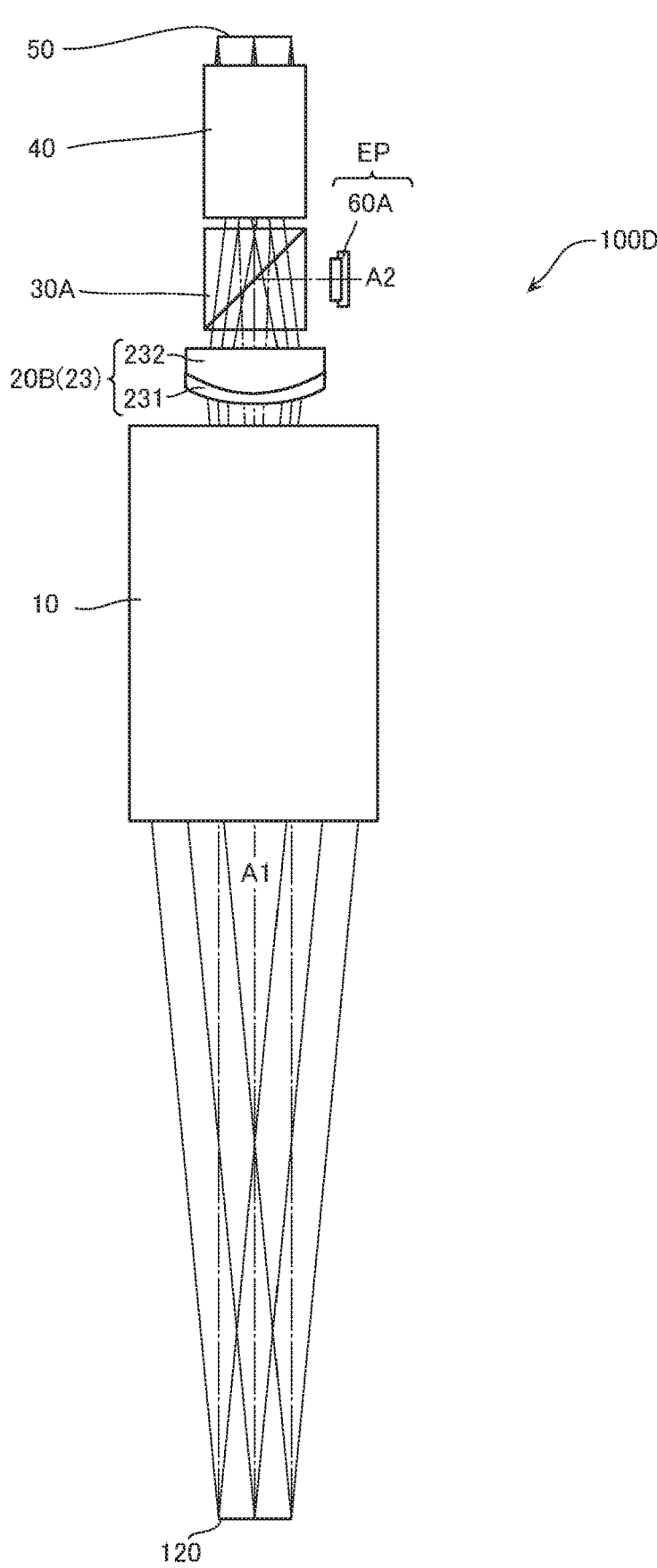
FIG. 9 is a schematic diagram of an optical device according to a fifth embodiment of the present invention.

Next, the fifth embodiment of the present invention is described with reference to FIG. 9. In the following description, parts similar to those in the first embodiment to the fourth embodiment are attached by same reference numerals and their descriptions are omitted.

An optical device 100D according to the fifth embodiment is basically configured similarly to the optical device 100C according to the fourth embodiment. In this case, similarly to the fourth embodiment, the cube type beam splitter 30A is used. A concave lens precedes to further increase the back focus of the first lens group. However, as described above, a lengthened focal length of the first lens group easily causes chromatic aberration, and the dispersion of glass constituting the beam splitter 30A also causes chromatic aberration. Therefore, the chromatic aberration to be corrected increases, and the refractive index difference and the difference in the Abbe number of glass constituting the first lens group need to be increased.

In the optical device 100D, a first lens group 20B includes a cemented lens 23 including a meniscus concave lens (first lens 231) made of glass having a refractive index of 1.883 and an Abbe number of 40.8 and a plano-convex lens (second lens 232) made of glass having a refractive index of 1.487 and an Abbe number of 70.2.

This configuration is effective when it is desired to ensure a relatively large interval between the first lens group 20B and the second lens group 40, that is, a space for arranging the beam splitter 30A. The embodiment can reduce chromatic aberration relatively preferably while ensuring a space for arranging a beam splitter.

Note that in the first embodiment to the third embodiment, similarly to the optical device 100D according to the fifth embodiment, the first lens group 20 may include a cemented lens including a meniscus concave lens and a plano-convex lens.

Sixth Embodiment

Next, the sixth embodiment of the present invention is described with reference to FIG. 10 and FIG. 11. In the following description, parts similar to those in the first embodiment to the fifth embodiment are attached by same reference numerals and their descriptions are omitted.

As described above, in the first embodiment to the fifth embodiment, the beam splitter 30 or 30A is disposed in the optical path between the first lens group 20 and the second lens group 40. However, in the first embodiment, the second embodiment, the fourth embodiment, and the fifth embodiment, the beam splitter may be disposed between the objective lens and an imaging target. In the following, such an example is described as the sixth embodiment.

Figure 10:
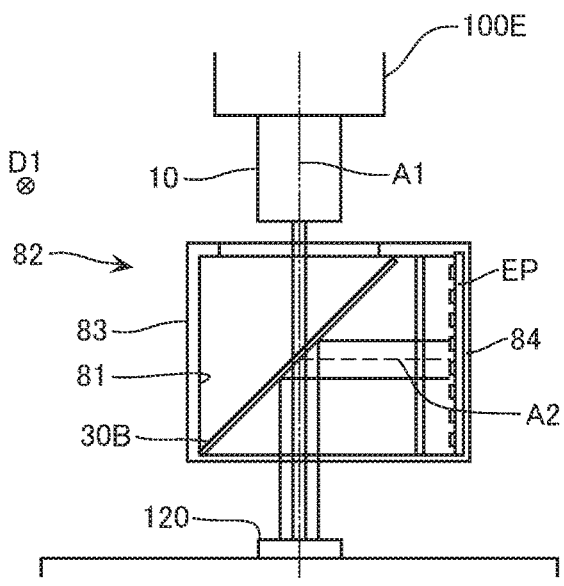
FIG. 10 is a schematic diagram of an optical device according to a sixth embodiment of the present invention.
Figure 11:
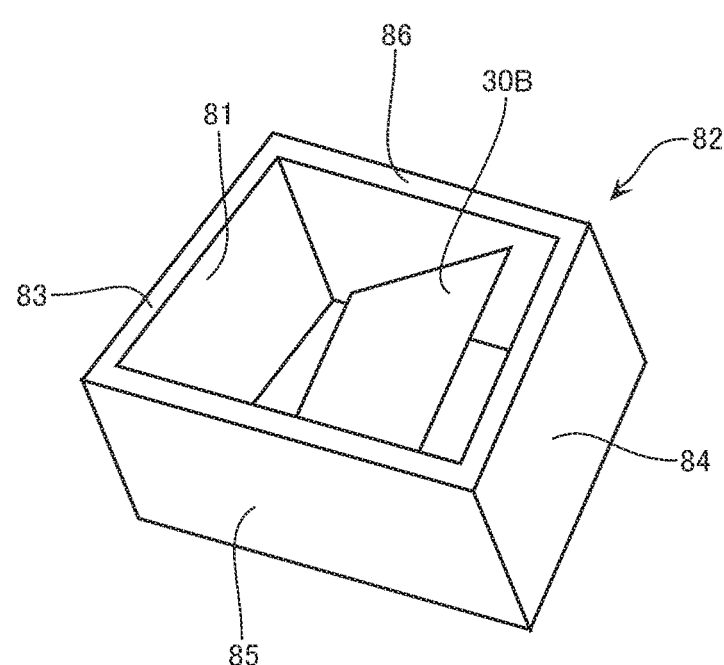
FIG. 11 is a schematic diagram of an optical damper according to the sixth embodiment of the present invention.

As illustrated in FIG. 10, an optical device 100E according to the sixth embodiment includes a housing 82 disposed between the objective lens 10 and the imaging target 120. The housing 82 houses a beam splitter 30B and the coaxial epi-illumination optical system EP. The beam splitter 30B may be configured similarly to the beam splitter 30 or the beam splitter 30A. The housing 82 also functions as an optical damper. Further, the housing 82 is configured to be removable from the optical device 100E.

In FIG. 10, the optical axis A1 of the objective lens 10, the optical axis A2 of the coaxial epi-illumination optical system EP, and a direction D1 perpendicular to the optical axes A1 and A2 are illustrated. As illustrated in FIG. 11, the housing 82 includes wall portions 83 and 84 intersecting with the optical axis A2 and wall portions 85 and 86 intersecting with the direction D1. The wall portion 84 is perpendicular to the wall portions 85 and 86 when viewed in the optical axis A1 direction. The wall portions 85 and 86 are parallel to one another when viewed in the optical axis A1 direction. The wall portion 83 is not perpendicular to the wall portions 85 and 86 when viewed in the optical axis A1 direction. In addition, the wall portion 83 is not parallel to the wall portion 84 when viewed in the optical axis A1 direction.

In the example of FIG. 10, the coaxial epi-illumination optical system. EP is disposed on the wall portion 84 side with respect to the beam splitter 30B. A surface on the beam splitter 30B side of the wall portion 83 functions as the damper surface 81 of an optical damper.

In the optical device 100E according to the sixth embodiment, the beam splitter 30 or 30A need not be disposed in the optical path between the objective lens 10 and the second lens group 40 (not illustrated in FIG. 10).

The optical device 100E according to the sixth embodiment can be used as a compact observation system by removing the housing 82 when the coaxial epi-illumination optical system EP is not necessary. When the beam splitter 30 or 30A is not disposed, the effect of decreasing a light quantity used for observation by the beam splitter is no longer provided by removing the housing 82, and therefore, a bright image can be obtained.

In the illustrated example, a part of the housing 82 functions as the damper surface of an optical damper. However, the housing 82 and an optical damper may be separate bodies.

In addition, the housing 82 may house an optical damper configured as a separate body.

Seventh Embodiment

As described above, in the first embodiment to the sixth embodiment, surface treatment for blackening is processed on the damper surface 81 of the optical damper 80. However, as described above, surface roughening by laser may be processed on the damper surface 81. This may allow the processed surface to configure a microstructure having a size finer than visible light. The processing by laser has features in which the degree of reflection and scattering can be decreased by blackening processing, and changes with time are very small.

Eighth Embodiment

As described above, in the first embodiment to the sixth embodiment, surface treatment for blackening is processed on the damper surface 81 of the optical damper 80. However, as described above, a black coating material may be applied over the damper surface 81. Such a black coating material may be, for example, a coating material, such as Canon GT-7 II Fine, or may be Japanese black ink and the like. Such a way can be achieved at a low price.

Ninth Embodiment

As described above, in the first embodiment to the sixth embodiment, surface treatment for blackening is processed on the damper surface 81 of the optical damper 80. However, as described above, surface roughening by blasting may be processed on the damper surface 81. In addition, plating may be performed for blackening after surface roughening. Such a way can be achieved at a low price. Further, the reflectance on the damper surface 81 can be reduced by surface roughening.

Tenth Embodiment

As described above, in the first embodiment to the sixth embodiment, surface treatment for blackening is processed on the damper surface 81 of the optical damper 80. However, as described above, surface roughening by chemical processing may be processed on the damper surface 81. When the optical damper 80 includes aluminum, metal ions whose redox potential is noble may be added to hydrochloric acid, and the optical damper 80 may be dipped in the solution. In addition, plating may be performed for blackening after surface roughening. By chemical processing, the damper surface 81 can be evenly roughened without unevenness.

Eleventh Embodiment

As described above, in the first embodiment to the sixth embodiment, surface treatment for blackening is processed on the damper surface 81 of the optical damper 80. However, light shielding paper or light shielding cloth may be stacked on the damper surface 81. Such a way can be achieved at an especially low price.

Others

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, in the first embodiment to the eleventh embodiment, the first lens group 20 may be omitted. The optical devices 100, 100A, 100B, 100C, 100D, and 100E according to the first embodiment to the eleventh embodiment do not include the objective lens 10. That is, the objective lens 10 is not a component of the optical devices 100, 100A, 100B, 100C, 100D, and 100E. However, the optical devices 100, 100A, 100B, 100C, 100D, and 100E according to the first embodiment to the eleventh embodiment may include the objective lens 10.

What is claimed is:

1. An optical device comprising:
   an image forming lens disposed in an optical path between an objective lens and an imaging device, the image forming lens forming an image of light incident via the objective lens on an imaging surface of the imaging device;
   a beam splitter disposed along an optical axis of the objective lens;
   a coaxial epi-illumination optical system configured to be able to illuminate an imaging target via the beam splitter, the coaxial epi-illumination optical system being arranged in an optical path different from the optical path in which the image forming lens is arranged; and an optical damper having a damper surface, wherein the beam splitter, the image forming lens, and the imaging device are arranged along the optical axis of the objective lens, an optical axis of the coaxial epi-illumination optical system is perpendicular to the optical axis of the objective lens, the beam splitter and the optical damper are arranged along the optical axis of the coaxial epi-illumination optical system, and a normal direction of the damper surface is perpendicular to the optical axis of the objective lens and inclines with respect to the optical axis of the coaxial epi-illumination optical system without being perpendicular to the optical axis of the coaxial epi-illumination optical system.

2. The optical device according to claim 1, comprising a housing that houses the image forming lens, wherein the housing is configured to be able to be attached to and detached from the objective lens.

3. The optical device according to claim 1, wherein the beam splitter comprises a film base material made of a resin film or a thin-type glass.

4. The optical device according to claim 3, wherein $$\sqrt{2}\,t\,\tan\left(\sin^{-1}\frac{1}{\sqrt{2}\,n}\right) < Np$$

where n is a refractive index of the film base material, t is a thickness of the film base material, p is a pixel pitch of the imaging device, and N×N is a unit pixel count for interpolation processing of a pixel value of the imaging device.

5. The optical device according to claim 3, wherein the beam splitter comprises a coating film disposed on at least one surface of the film base material.

6. The optical device according to claim 5, wherein the coating film is disposed on each of both surfaces of the film base material, and a coating film disposed on one surface of the film base material and a coating film disposed on the other surface of the film base material have a same sign of stress resulting from coating.

7. An optical device comprising:

an image forming lens disposed in an optical path between an objective lens and an imaging device, the image forming lens forming an image of light incident via the objective lens on an imaging surface of the imaging device;

a beam splitter disposed along an optical axis of the objective lens;

a coaxial epi-illumination optical system configured to be able to illuminate an imaging target via the beam splitter, the coaxial epi-illumination optical system being arranged in an optical path different from the optical path in which the image forming lens is arranged; and an optical damper having a damper surface, wherein the beam splitter and the coaxial epi-illumination optical system are arranged along the optical axis of the objective lens, an optical axis of the image forming lens is perpendicular to the optical axis of the objective lens, the imaging device, the beam splitter, and the optical damper are arranged along the optical axis of the image forming lens, and a normal direction of the damper surface is perpendicular to the optical axis of the objective lens and inclines with respect to the optical axis of the image forming lens without being perpendicular to the optical axis of the image forming lens.

8. The optical device according to claim 7, comprising:

a housing that houses the image forming lens, wherein the housing is configured to be able to be attached to and detached from the objective lens.

9. The optical device according to claim 7, wherein the beam splitter comprises a film base material made of a resin film or a thin-type glass.

10. The optical device according to claim 9, wherein $$\sqrt{2}\,t\,\tan\left(\sin^{-1}\frac{1}{\sqrt{2}\,n}\right) < Np$$

where n is a refractive index of the film base material, t is a thickness of the film base material, p is a pixel pitch of the imaging device, and N×N is a unit pixel count for interpolation processing of a pixel value of the imaging device.

11. The optical device according to claim 9, wherein the beam splitter comprises a coating film disposed on at least one surface of the film base material.

12. The optical device according to claim 11, wherein the coating film is disposed on each of both surfaces of the film base material, and a coating film disposed on one surface of the film base material and a coating film disposed on the other surface of the film base material have a same sign of stress resulting from coating.

* * * * *